Patented Apr. 12, 1927.

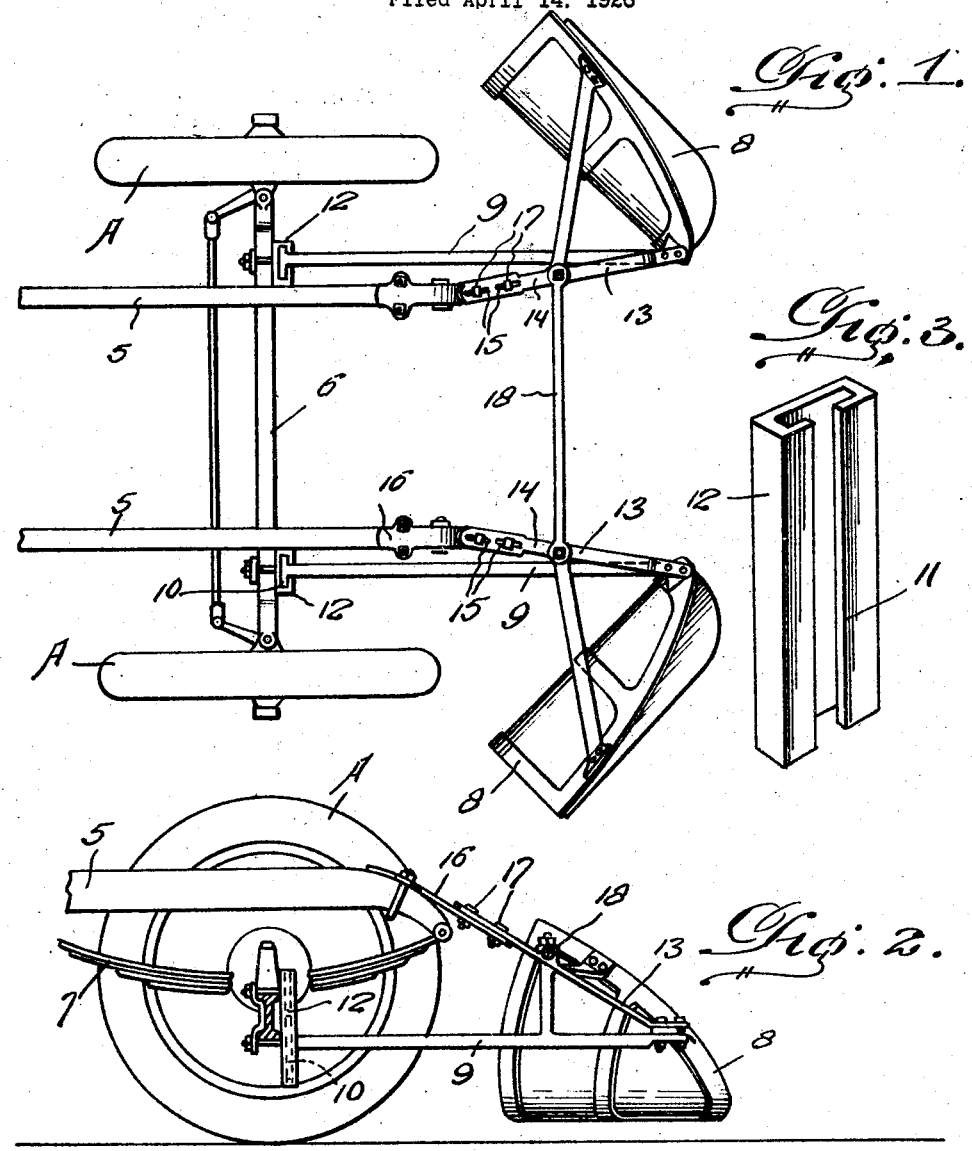
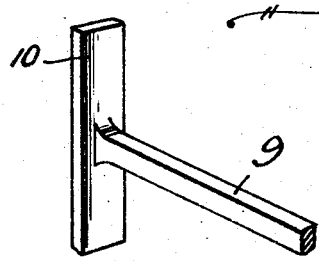

1,624,809

UNITED STATES PATENT OFFICE.

JOHN B. SEWELL, OF ZANESFIELD, OHIO.

SNOW-CLEARING APPARATUS FOR AUTOMOBILES.

Application filed April 14, 1926. Serial No. 101,963.

This invention relates to a snow clearing apparatus for automobiles, and has for its primary object to provide means for attachment to the front end of an automobile whereby tracks in snow are made to permit the wheels to run therein in order that the machine will not become stalled in the snow, especially when the same is relatively deep which is now generally the case.

An additional object of the invention resides in the provision of a construction of this character that may be readily applied to practically all types of automobiles without requiring any change whatever in the construction of the machine and without requiring great skill and undue manual labor in the application or removal of the same with respect to the machine.

Other objects will become apparent as the nature of the invention is better understood, the same comprising the novel form, combination and arrangement of parts hereinafter more fully described, shown in the accompanying drawing and claimed.

In the drawing wherein like reference characters indicate corresponding parts throughout the various views:

Figure 1 is a top plan view of my snow clearing device as actually associated with the forward end of an automobile, such automobile being disclosed in fragmentary stripped top plan.

Figure 2 is a longitudinal section taken through Figure 1 for disclosing one unit of the device in side elevation.

Figure 3 is an enlarged perspective of one of the plow arm attaching plates that is stationarily mounted upon the front side of the forward vehicle axle, and Figure 4 is a rear end perspective of one of the plow carrying arms that is cooperatively constructed for sliding movement in said plate.

Now having particular reference to the drawing, 5—5 in Figures 1 and 2 designate the frame bars of an automobile extending transversely beneath the forward ends of which is the usual front axle 6, maintained in spaced relation with the bars through medium of the usual springs, one of which is disclosed in Figure 2, and designated 7.

My invention per se constitutes the provision of a pair of units, each of which includes a desirable form of snow plow 8 to the forward inner side of which is rigidly connected the front end of a metallic arm 9. Said plows extending rearwardly in an outwardly diagonal manner with respect to the arms as clearly disclosed in Figure 1. The rear end of each arm 9 is formed with a plate-like head 10 that is adapted for sliding movement within a T-shaped slot 11 of an attaching plate 12. Said plates are rigidly mounted upon the forward side of the axle 6 between the frame bars 5—5 and the front steering wheels A—A.

Rigidly secured to the inner side of each plow 8 at the upper edge thereof is an inwardly extending rearwardly inclined V-shaped spider or bracket 13 that is formed with a rearwardly extending arm 14 that is provided with a pair of longitudinally extending spaced slots 15. Bolted to the forward curved end of each chassis bar 5 is an arm 16, the forward end of which projects beyond the end of the chassis bar and is also provided with a pair of similar slots in order that the spider or bracket may be adjustably secured thereto through reason of bolt and nut connections 17.

Interconnecting the spider 13—13 of the unit is a brace rod 18 and in view of the foregoing description when considered in accompaniment with the drawings forming a part of this application it will be at once apparent that by reason of such a construction, paths will be cleared for the wheels of the vehicle when the same is moving over the road in order to permit of the proper operation of the vehicle regardless of the depth of the snow upon said roads. It will also be apparent that by reason of the connections between the arms 9—9 and the axle 6, the plows of the units will be maintained stationary while said axle will be permitted to raise and lower when passing over uneven road surfaces without disrupting the connections between the plows and the axle and the frame bars.

The operation and advantages of a device of this character will be readily appreciated by those skilled in the art, even though I have herein shown and described the same as comprising certain detail features of construction, it is nevertheless to be understood that departures may be had therefrom without departing from the spirit and scope of the appended claims.

Having thus described the invention, what I claim as new and desire to secure by Letters Patent is:—

1. In a snow plow construction for motor vehicles, a pair of plate members adapted to be rigidly attached to the front axle of the vehicle, between the sides of the chassis and the front wheels of the vehicle, a pair of arms cooperatively constructed at their rear ends for slidable association with the respective plate members, said arms extending forwardly in a horizontal plane, a pair of snow plows rigidly attached to the forward ends of the arms and extending diagonally in front of the vehicle front wheels, a bracket rigidly associated with the upper inner portion of each plow and extending rearwardly therefrom, a bar secured at its rear end to the forward end of each of the chassis side bars, the forward ends of said bars being secured to the respective brackets, and a brace rod extending between the brackets.

2. In a snow plow construction for motor vehicles, a pair of plate members adapted to be rigidly attached to the front axle of the vehicle, between the sides of the chassis and the front wheels of the vehicle, a pair of arms cooperatively constructed at their rear ends for slidable association with the respective plate members, said arms extending forwardly in a horizontal plane, a pair of snow plows rigidly attached to the forward ends of the arms and extending diagonally in front of the vehicle front wheels, a substantially V-shaped spider associated with each plow, the forward ends of the arms of each V-shaped spider being rigidly attached to the upper inner portion of each plow, said V-shaped spiders extending rearwardly, a rearwardly extending arm forming a continuation of one of the arms of each V-shaped spider, a bar secured at its rear end to the forward end of each of the chassis side bars, the forward ends of the bars being adjustably secured to the rear ends of the extension arms of said V-shaped spiders, and a brace rod extending between the V-shaped spiders at the apices thereof.

In testimony whereof I affix my signature.

JOHN B. SEWELL.